(12) United States Patent
Nishiuchi

(10) Patent No.: US 7,840,026 B2
(45) Date of Patent: Nov. 23, 2010

(54) APPARATUS AND METHOD FOR DETECTING OBJECTS

(75) Inventor: Hidekazu Nishiuchi, Chiba (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 116 days.

(21) Appl. No.: 10/575,216

(22) PCT Filed: Dec. 2, 2005

(86) PCT No.: PCT/IB2005/003652

§ 371 (c)(1),
(2), (4) Date: Apr. 10, 2006

(87) PCT Pub. No.: WO2006/092658

PCT Pub. Date: Sep. 8, 2006

(65) Prior Publication Data

US 2008/0247596 A1 Oct. 9, 2008

(30) Foreign Application Priority Data

Dec. 3, 2004 (JP) .............................. 2004-351086

(51) Int. Cl.
*G06K 9/00* (2006.01)

(52) U.S. Cl. ..................... 382/100; 382/128; 382/154; 382/105; 382/106; 348/149; 348/114; 701/2; 701/45; 701/29; 280/735

(58) Field of Classification Search ................. 382/100, 382/154, 105, 106, 104; 348/211.99, 149, 348/148, 114; 701/3, 96, 301; 340/435
See application file for complete search history.

(56) References Cited

U.S. PATENT DOCUMENTS 6,531,959 B1 * 3/2003 Nagaoka et al. ............. 340/435
6,535,114 B1 * 3/2003 Suzuki et al. ............... 340/435

(Continued)

FOREIGN PATENT DOCUMENTS

DE 103 01 401 A1 2/2004

(Continued)

OTHER PUBLICATIONS

European Search Report dated Aug. 21, 2006.

(Continued)

*Primary Examiner*—Wesley Tucker
*Assistant Examiner*—Nancy Bitar
(74) *Attorney, Agent, or Firm*—Young Basile

(57) ABSTRACT

An apparatus for detecting an object is provided which detects the pitching of a vehicle, and detects the presence of an object the front of the vehicle itself with the pitching being taken into consideration. The apparatus includes a microcomputer that performs image processing for the image of the object to compute the velocity and acceleration of the object present in the picked-up image, and based on the computed acceleration of the object, to determine whether the image was captured when the vehicle itself was balanced. If the image is judged to be an image captured when the vehicle itself was not balanced, then the position of the object present in the picked-up image is computed based on another picked-up image that was captured when the vehicle itself was balanced.

19 Claims, 5 Drawing Sheets

U.S. PATENT DOCUMENTS

| | | | |
|---|---|---|---|
| 7,164,117 B2 * | 1/2007 | Breed et al. | 250/221 |
| 7,164,177 B2 * | 1/2007 | Chang et al. | 257/406 |
| 7,197,388 B2 * | 3/2007 | Xu et al. | 701/70 |
| 7,620,237 B2 * | 11/2009 | Nagaoka et al. | 382/154 |
| 2003/0160866 A1 * | 8/2003 | Hori et al. | 348/116 |
| 2003/0191568 A1 * | 10/2003 | Breed | 701/36 |
| 2005/0165550 A1 | 7/2005 | Okada | 701/301 |
| 2005/0278098 A1 * | 12/2005 | Breed | 701/45 |
| 2006/0256198 A1 * | 11/2006 | Nishiuchi | 348/148 |
| 2008/0273750 A1 * | 11/2008 | Fujimoto | 382/103 |

FOREIGN PATENT DOCUMENTS

| | | |
|---|---|---|
| DE | 203 20 551 U1 | 10/2004 |
| GB | 2 373 219 A | 9/2002 |
| JP | 01-273746 | 11/1989 |
| JP | 2001-084497 | 3/2001 |
| JP | 2003-247824 | 9/2003 |

OTHER PUBLICATIONS

Batavia P H et al: "Overtaking Vehicle Detection Using Implicit Optical Flow" Intelligent Transportation System, 1997. ITSC '97., IEEE Conference on Boston, MA, USA Nov. 9-12, 1997, New York, NY, USA, IEEE, US, Nov. 9, 1997, pp. 729-734, XP010270899, ISBN: 978-0-7803-4269-9.

Andrea Giachetti et al: "The Use of Optical Flow for Road Navigation" IEEE Transactions on Robotics and Automation, IEEE Inc., New York, US, vol. 14, No. 1, Feb. 1, 1998, pp. 34-48, XP011053264 ISSN: 1042-296X.

* cited by examiner

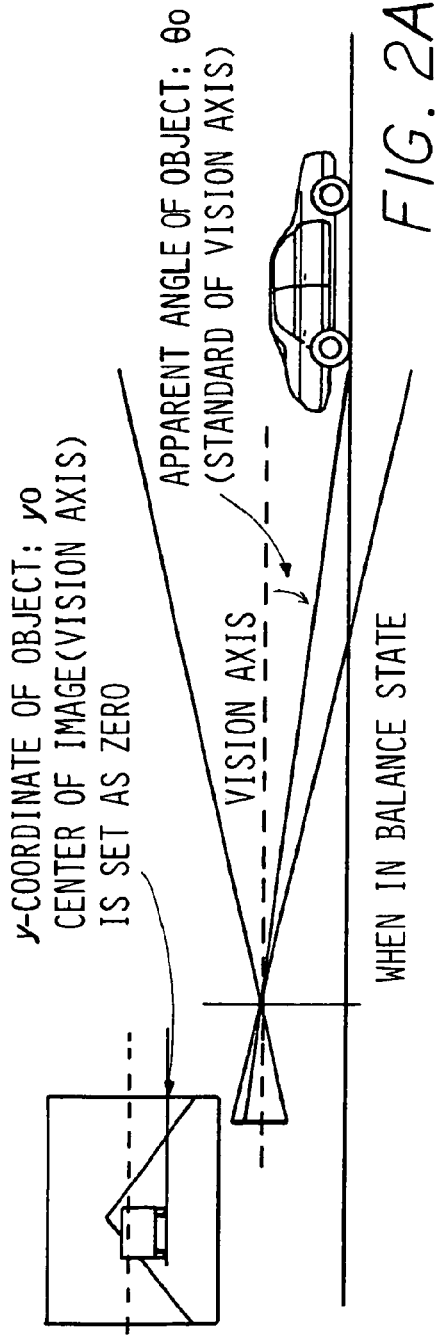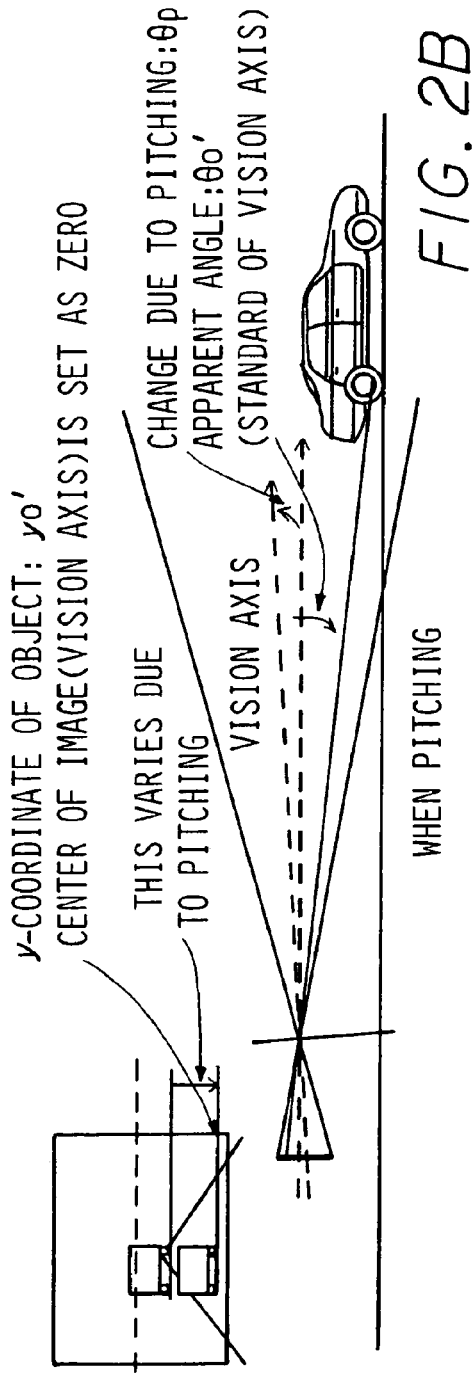

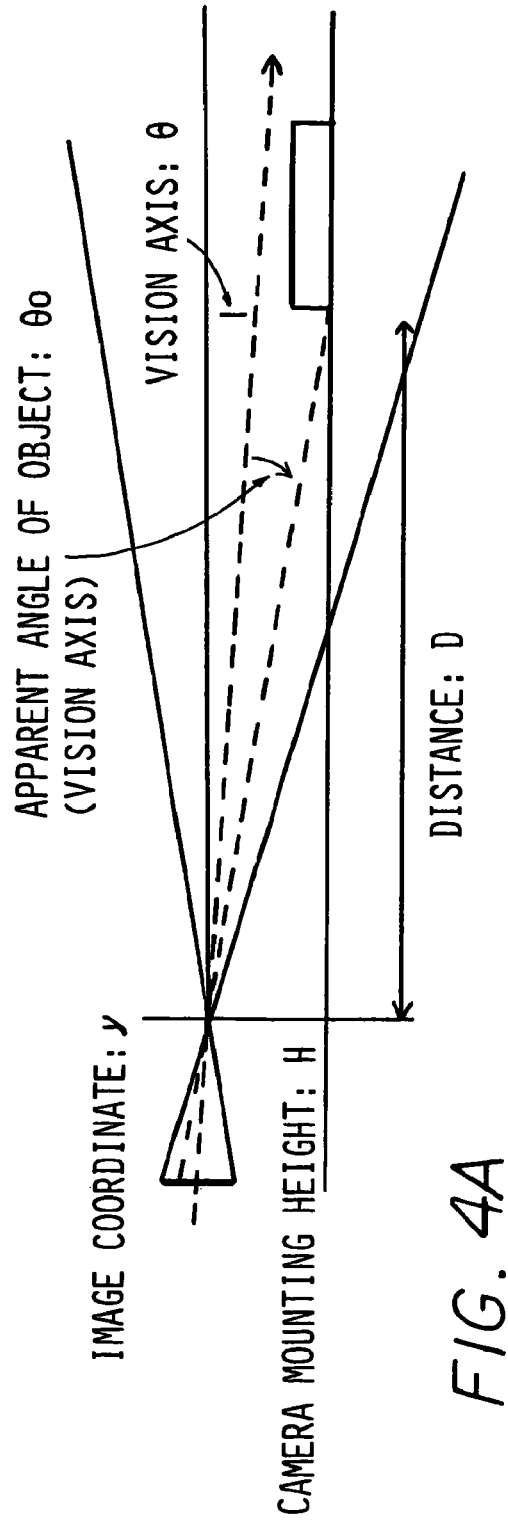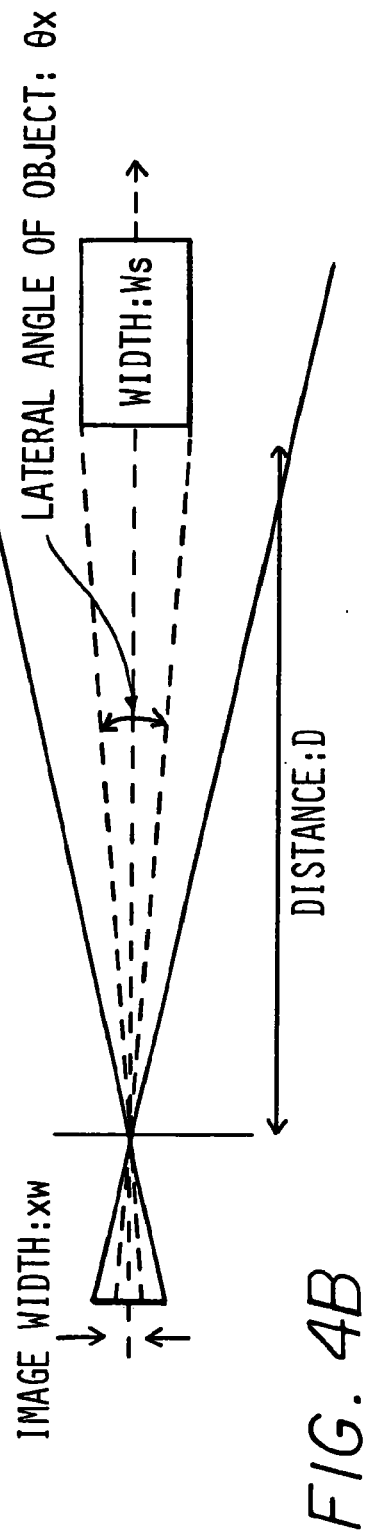
FIG. 4A
FIG. 4B

APPARATUS AND METHOD FOR DETECTING OBJECTS

BACKGROUND

The present invention pertains to the technical field of object detection, and in particular to techniques for detecting a moving object in front of a vehicle.

Japanese Kokai Patent Application No. 2001-84497 discloses a position-detecting device in which multiple objects are extracted from the images captured by an onboard camera, and based on the variation over time of the position in y-direction i.e., height of the objects, correction of the y-coordinates of the objects is performed taking into consideration the pitching and other behavior of the vehicle. As a result, it is possible to detect the position of each object by excluding the influence of the pitching and other behavior of the vehicle. However, because detection of the y-coordinate is performed based on the variation over time of the position of the object in y-direction, it is difficult to detect variation in the position of the object due to pitching that takes place due to passengers, cargo, etc.

SUMMARY

In accordance with one aspect of the invention, an apparatus is provided for detecting the position of an object in one or more images captured by an image pickup device mounted on a vehicle. The apparatus includes a memory on which is stored a plurality of images captured by the image pickup device, including a first image of an object taken at a first time when the vehicle is balanced and a second image of the object captured at a second time; and a controller operatively coupled to the memory and adapted to determine whether the second image was captured when the vehicle was balanced, and to determine the position of the object in the second image based on the position of the object in the first image if the second image was captured when the vehicle was not balanced.

In accordance with another aspect of the invention, a method is provided for detecting the position of an object in an image captured by an image pickup in a vehicle The method includes determining whether a first image of an object captured by an image pickup was captured when the vehicle was balanced; and determining the position of the object in the first image if the first image was captured when the vehicle was not balanced, which determination is based on a second image of the same object that was captured when the vehicle was balanced.

BRIEF DESCRIPTION OF THE DRAWINGS

The description herein makes reference to the accompanying drawings wherein like reference numerals refer to like parts throughout the several views, and wherein:

FIG. 2A is a diagram of the position of an object relative to a vehicle in which the object-detecting device of FIG. 1 has been installed, when the vehicle in a balanced state.

FIG. 2B is a diagram of the position of an object relative to a vehicle in which the object-detecting device of FIG. 1 has been installed, when the vehicle is pitching.

FIG. 4A is a diagrammatic side elevation of the position of an object in the path of a vehicle in which the object-detecting device of FIG. 1 has been installed.

FIG. 4B is a diagrammatic overhead plan view of the position of an object in the path of a vehicle in which the object-detecting device of FIG. 1 has been installed

DETAILED DESCRIPTION

In an embodiment of the invention described below, a judgment is made as to whether the picked-up image was captured when the vehicle itself was balanced; if it is judged that the picked-up image was captured when the vehicle itself was not balanced, the position of the object present in the picked-up image is computed based on the information about the object computed from the picked-up image captured when the vehicle itself was balanced. As a result, even when pitching takes place due to passengers or cargo, it is determined that the picked-up image was captured when the vehicle itself was not balanced, and it is possible to compute the position of the object in the image correctly.

Figure 1:
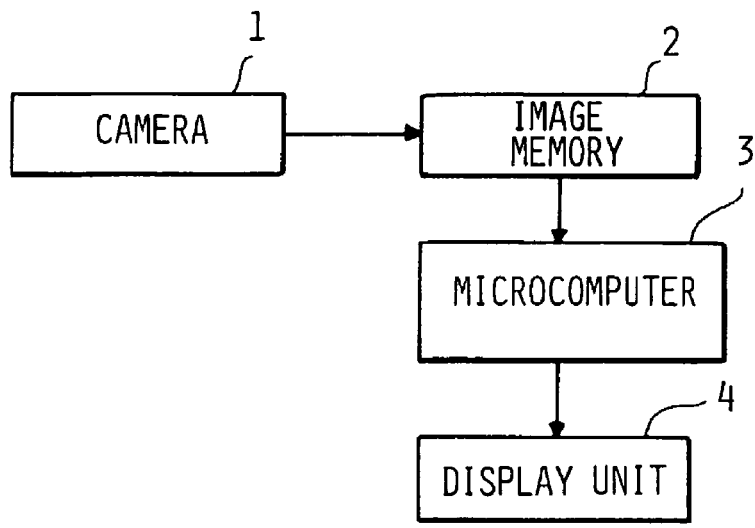
FIG. 1 is a block diagram of a device for detecting objects in accordance with a first embodiment of the invention.

FIG. 1 is a block diagram of a first embodiment of the invention. The object-detecting device 100 is mounted on board the vehicle, and it includes camera 1, image memory 2, microcomputer 3, and display unit 4. The camera 1 is arranged at the front of the vehicle, and it takes pictures at a constant time interval Δt. The image memory 2 converts each image captured with camera 1 to digital data and stores it. The microcomputer 3 reads the digital image stored in image memory 2. As will be explained later, the size of the object in real space and the distance to the object are detected, taking into consideration the pitching of the vehicle. The display unit 4 displays the detected object in a bird's-eye-view mapped downward onto a map with the vehicle itself at the center.

For purpose of illustrating the first embodiment of the invention, it is assumed that in the image captured with camera 1, only one moving object, such as another vehicle, is present, and the real-space size of the object present in the image has a width that can be detected on the image.

FIGS. 2A and 2B show an example of change in the position of the object present the front of the vehicle in the picked-up image when the vehicle is in balance (FIG. 2A) and when pitching of the vehicle takes place (FIG. 2B). As shown in FIG. 2A, assuming the deviation angle to be θo when the object is viewed from the camera vision axis θ with respect to the horizontal direction, y-coordinate value yo in the picked-up image when the vehicle is balanced to be defined later is computed using the following Equation 1:

$$yo = \alpha \theta o \quad (1)$$

Here, α is a constant that can be uniquely computed from the image pickup element size, focal distance, etc., of camera 1 hereinafter to be referred to as the "camera parameters".

In this case, when pitching of the vehicle takes place, as shown in FIG. 2B, and the pitching angle in this case is θp, y-coordinate yo' of the object in the image is computed using the following Equation 2:

$$yo' = \alpha \theta o' = \alpha(\theta o + \theta p) = yo + \alpha \theta p \quad (2)$$

That is, the change in the y-coordinate of the object in the image when pitching takes place can be seen to be proportional to the size of pitching angle θp.

Figure 3:
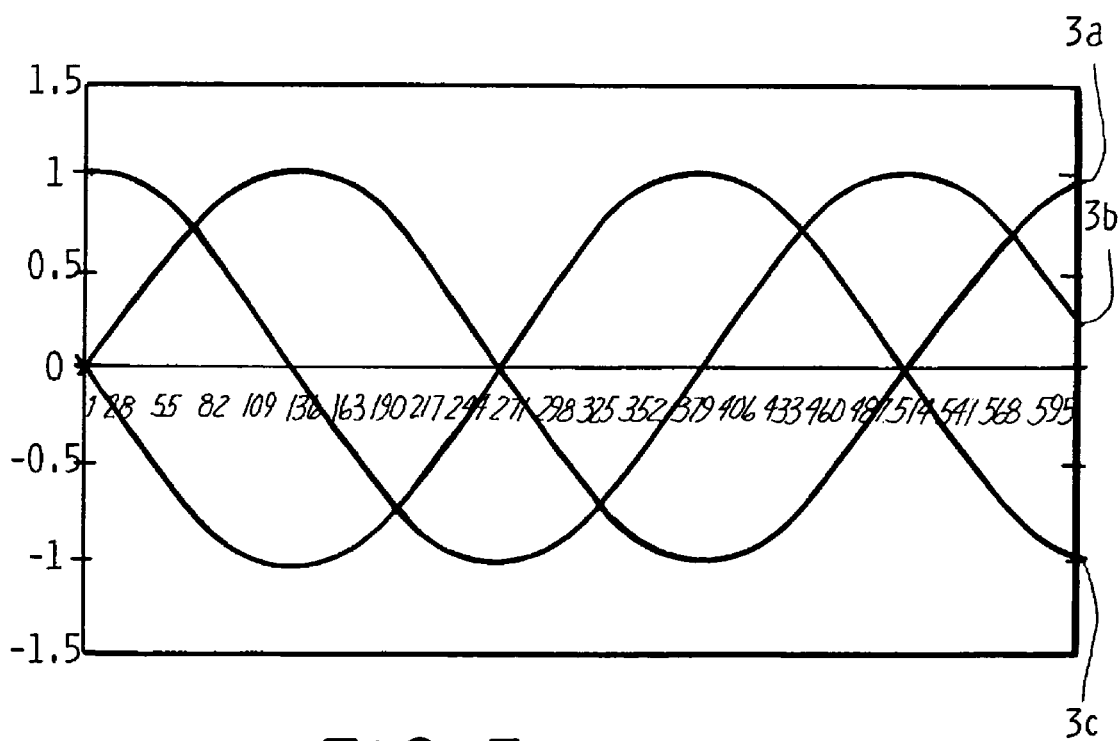
FIG. 3 is a graph over time of angle θp of vehicle pitching, the velocity in the y-direction of the object in images captured by the device of FIG. 1, and the acceleration in the y-direction of the object in the images.

FIG. 3 shows the relationship over time of pitching angle θp and the y-axis acceleration of the object in the image, that is, the vertical acceleration of the image acceleration.

As shown in FIG. 3, characteristic curve 3a shows the up/down periodic movement periodic movement over time due to pitching when pitching takes place; characteristic curve 3b shows the change in image velocity over time image velocity; and characteristic curve 3c shows the change in image acceleration over time. As shown in FIG. 3, when image acceleration 3c is zero, image velocity 3b is maximum or minimum, and periodic movement 3a is at the inflection point. When the curve 3a is at the inflection point, the pitch of the vehicle is at zero, and thus the vehicle is level. When the curve 3a is not at the inflection point, the pitch of the vehicle has some magnitude, indicating that the vehicle is non-level. Because the inflection point of periodic movement 3a shows the point at which the vehicle is balanced (i.e., when the pitch of the vehicle is level), it is possible to judge that an image with an image acceleration 3c of zero is one captured when the vehicle itself was balanced when pitching of the vehicle itself took place.

Also, in this embodiment, edge extraction processing for the picked-up image allows the well-known gradient method and block matching method to be adopted to compute the optical flow, and the velocity of the object present in the image is detected. As a result, the image velocity 3b and image acceleration 3c are detected. The edge extraction processing and the optical flow computation processing are well-known technologies, and are explained below in connection with FIG. 6.

Based on the image for which image acceleration 3c in the y-direction is zero for the object detected on the image, that is, the image captured when the vehicle itself was balanced image, it is possible to compute the y-coordinate of the object in the image, to be explained later, the width of the object in real space (the size of the object), and the distance from camera 1 to the object, that is, distance D from the focal position of camera 1 to the object. FIGS. 4A and 4B show an example of the situation in which the image captured when the vehicle is balanced, is used to compute the y-coordinate of the object in the image, the width of the object in real space, and the distance between the focal position of camera 1 and the object. FIG. 4A shows a side view of the object, and FIG. 4B shows an top view of the object.

As shown in FIG. 4A, using vision axis θ of camera 1 and apparent angle of the object θo that can be detected in the image, the y-coordinate of the object in the image can be computed using the following Equation 3.

$$y = \alpha(\theta + \theta o) \quad (3)$$

Also, assuming the pre-measured camera mounting height to be H, the vision axis of camera 1 to be θ, and the apparent angle of the object to be θo, distance D from the focal position of camera 1 to the object is D can be computed using the following Equation 4.

$$D = H/\tan(\theta + \theta o) \quad (4)$$

Width Ws of the object is then computed. As shown in FIG. 4B, based on the relationship between image width xw and lateral angle θx of the object, the following Equation 5 is obtained.

$$xw = \beta \theta x \quad (5)$$

Here, β is a constant that can be uniquely computed from the camera parameters.

Consequently, using Equation 5, one can compute width Ws of the object using the following Equation 6.

$$Ws = \theta x \cdot D = xw/\beta \cdot D \quad (6)$$

Consequently, based on the image balanced, it is possible to compute the y-coordinate of the object, width Ws of the object, and distance D from the focal position of camera 1 to the object using Equations 3, 4 and 6.

However, when pitching of the vehicle takes place often, the vision axis θ of camera 1 changes according to the pitching angle, and the magnitude of the change is unclear. Consequently, in this case, it is impossible to compute the y-coordinate of the object, width Ws of the object, and distance D from the focal position of camera 1 to the object using the processing. Consequently, for an image for which image acceleration 3c is not zero, these can be computed as follows.

First of all, the balanced images, captured at different times T1 and T2, of the presence of the object judged to be the same object in the image for which image acceleration 3c is not zero, are read from image memory 2. Whether the objects detected in the images with a non-zero image acceleration 3c are the same object can be judged by checking whether they have a similar velocity in the images and a similar shape after edge extraction processing and detection. Also, camera 1 in this embodiment is a high-speed camera, and it takes consecutive pictures from the front of the vehicle at a minute prescribed time interval Δt, such as 2 ms. The precondition is that the balanced images captured at different times T1 and T2 must contain the same object detected in the image with non-zero image acceleration 3c. The following explanation is given based on this precondition.

It is possible to represent the distances D1 and D2, between the focal position of camera 1 and the object in the images balanced at times T1 and T2, with the following Equations 7 and 8 using Equation 4 by utilizing the apparent angles θo1 and θo2 of the object at the times, respectively.

$$D1 = H/\tan(\theta + \theta o1) \quad (7)$$

$$D2 = H/\tan(\theta + \theta o2) \quad (8)$$

Also, widths Ws of the object at times T1 and T2 can be represented with the following Equations 9 and 10 using Equation 6 from the lateral angle θx1 and θx2 of the object at the times, respectively.

$$Ws = \theta x1 \cdot D1 \quad (9)$$

$$Ws = \theta x2 \cdot D2 \quad (10)$$

As a result, by substituting Equations 7 and 8 into Equations 9 and 10, respectively, one can obtain the following Equations 11 and 12:

$$Ws = \theta x1 \cdot H/\tan(\theta + \theta o1) \quad (11)$$

$$Ws = \theta x2 \cdot H/\tan(\theta + \theta o2) \quad (12)$$

In Equations 11 and 12, when an image from far the front of the vehicle is captured with on-board camera 1, it is possible to set approximately θ≈0, θo1≈0, and θo2≈0. Consequently, in Equation 11, one has tan θ+θo 1→θ+θo1. In Equation 12, one has tan θ+θo2→θ+θo2. As a result, Equations 11 and 12 are represented by following Equations 13 and 14, respectively. Based on this relationship, one can obtain the following Equations 15 and 16:

$$Ws = \theta x1 \cdot H/(\theta + \theta o1) \quad (13)$$

$$Ws = \theta x2 \cdot H/(\theta + \theta o2) \quad (14)$$

$$Ws \cdot (\theta + \theta o1) = \theta x1 \cdot H \quad (15)$$

$$Ws \cdot (\theta + \theta o2) = \theta x2 \cdot H \quad (16)$$

Here, by subtracting Equation 16 from Equation 15, the following Equation 17 can be obtained, and it is possible to compute width Ws of the object.

$$Ws = H \cdot (\theta x1 - \theta x2)/(\theta o1 - \theta o2) \quad (17)$$

As a result, even when pitching of the vehicle takes place, and the vision axis θ of camera 1 for the images captured in this case becomes unknown, it is still possible to compute width Ws of the object from the camera mounting height H that can be detected in the two images balanced at different times for the same object, as well as from θo1, θo2, θx1 and θx2 that can be measured from the images.

Based on the width Ws of the object computed in this case, distance D from the focal position of camera 1 to the object in the images captured during the pitching state, it is possible to derive the following Equation 18 using Equation 6.

$$D = Ws/\theta x = Ws \cdot \beta/xw \quad (18)$$

As a result, by means of Equation 4, vision axis θ of camera 1 can be computed with the following Equation 19 using distance D from the focal position of camera 1 to the object.

$$\theta = a\tan(H/D) - \theta o \quad (19)$$

As a result, even when there is change in vision axis θ of camera 1 when pitching of the vehicle takes place, it is still possible to compute width Ws of the object and vision axis θ of camera 1 based on the images captured at different times T1 and T2. Since vision axis θ of camera 1 has been computed, it is possible to compute the y-coordinate of the object in the image using Equation 3.

Based on the y-coordinate in the image computed using the processing, for example, it is possible to mark the object on a bird's-eye-view map displayed on display 4. As a result, even when pitching of the vehicle takes place, it is still possible to reliably correct for the deviation of the object in the y-direction in the image due to pitching, and to display the obtained result in a bird's-eye-view map.

Figure 5:
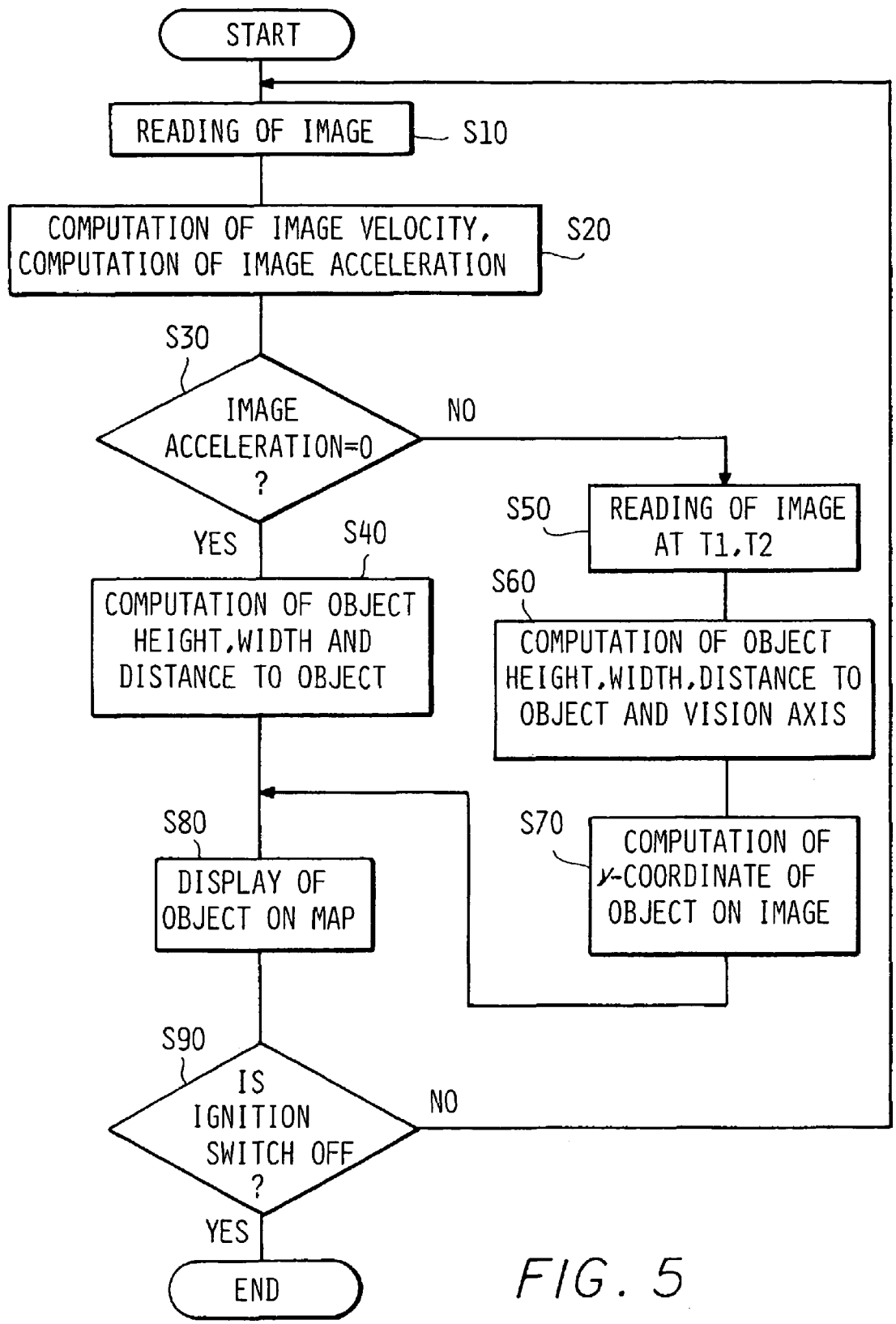
FIG. 5 is a flow chart of the operation of the object-detecting device shown in FIG. 1.

FIG. 5 is a flow chart illustrating the process of object-detecting device 100 in this embodiment. The processing shown in FIG. 5 is carried out as follows: the ignition switch of the vehicle is turned ON, the power supply for the object-detecting device is turned ON, and the program is started that is used to execute the processing with microcomputer 3. In step S10, the picked-up images captured with camera 1 and stored in image memory 2 are read, and process flow then continues to step S20.

In step S20, edge extraction processing is performed on any image that is read as described above to compute the optical flow. As a result, image velocity 3b and image acceleration 3c are computed, and process flow continues to step S30. In step S30, determination is made as to whether the computed image acceleration 3c is zero. If it is determined that the computed image acceleration 3c is zero, the read image was judged to have been captured when the vehicle was balanced, and process flow continues to step S40. In step S40, as explained above, the y-coordinate of the object, width Ws of the object, and distance D from the focal position of camera 1 to the object are computed by means of the Equations 3, 4 and 6.

Figure 6:
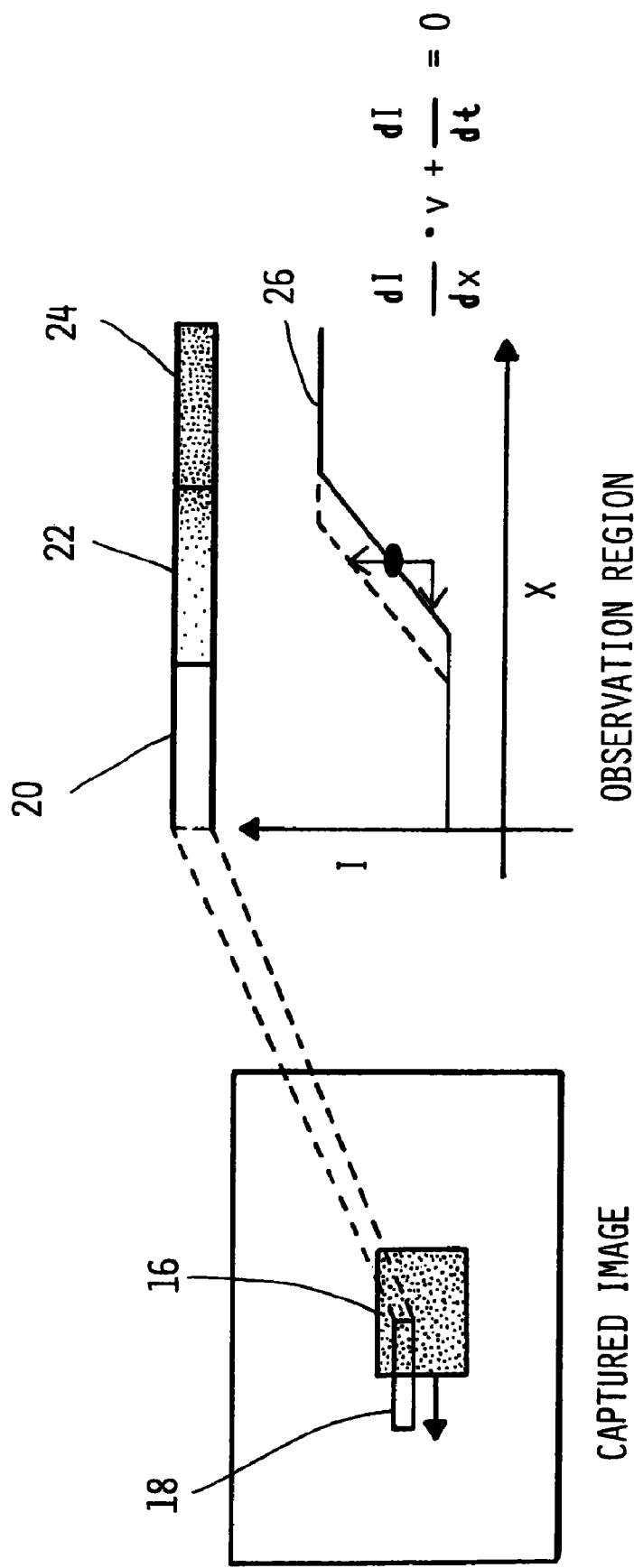
FIG. 6 is a diagram illustrating computation of image velocity by the object-detecting device of FIG. 1.

FIG. 6 is a diagram illustrating computation of image velocity and image acceleration at step S20. Referring to FIG. 6, a captured image 16 is shown moving toward the left. A observation region 18 of captured image 16 includes a background region 20, an edge region 22 and an object region 24. The luminosity (I) of regions 20, 22 and 24 vary with respect to position (x) as well as time (t), since the object in image 16 is moving leftward. In FIG. 6, luminosity of these regions is plotted (curves 26) against position (x) at time T1 (solid line) and T2 (dotted line). The curves 26 represented by luminosity at times T1 and T2 are shifted because of the left-ward movement of the image.

To compute velocity, for each of the each of the pixels extracted as the edge, variation of luminance in space in the longitudinal direction in the prescribed region is computed (the slope dI/dx as shown in FIG. 6). Then, for each of the pixels extracted as the edge, variation of luminance over time between the prescribed frames is computed (dI/dt as shown in FIG. 6). For each of the pixels extracted as the edge, from the variation of luminance in space and the variation of luminance over time, the image velocity in the longitudinal direction is computed based on the following formula:

$$dI/dx \cdot v + dI/dt = 0 \quad [20]$$

Also, from the variation of the image velocity over time computed in the above, the image acceleration is computed.

On the other hand, when it is determined that the computed image acceleration 3c is not zero, it is judged that the read image was captured when pitching was taking place, and process flow continues to step S50. In step S50, the images captured in the balanced state at different times T1 and T2 and containing the same object as the object detected in the picked-up image are read from image memory 2. Process flow then continues to step S60. Width Ws of the object in real space, distance D from the focal position of camera 1 to the object, and vision axis θ of camera 1 are then computed by means of Equations 17, 18, and 19. Then, process flow continues to step S70, and the y-coordinate of the object is computed using Equation 3.

Then, process flow continues to step S80. In this step, based on the y-coordinate of the object and width Ws of the object in real space, the detected object is mapped on a bird's-eye-view map, and this is displayed on display unit 4. Process flow then continues to S90. In step S90, a judgment is made as to whether the ignition switch of the vehicle is OFF. If it is not OFF, flow returns to step S10 and the process is repeated. If it is OFF, the processing comes to an end.

In the present embodiment explained above, the following features can be realized.

The image acceleration (3c of FIG. 3) of the image of the object is computed, and the image for which image acceleration 3c for the image of the object is found not to be zero is judged to be an image captured when the vehicle was pitching. As a result, it is possible to detect the occurrence of pitching without carrying a device for detecting the posture of the vehicle or another device for detecting pitching, so that the cost of the device can be reduced with this constitution.

For the image captured when no pitching of the vehicle takes place, that is, for an image captured in the balanced state, distance D from the focal position of camera 1 to the object is computed based on camera mounting height H, vision axis θ of camera 1, and apparent angle of the object θo, and object width Ws can be computed based on image width xw, object lateral angle θx, and the distance from the focal position of camera 1 to the object. As a result, the distance to the object and the size of the object can be detected without any need for a dedicated sensor, and the device can be realized with a simple constitution.

When pitching of the vehicle takes place, width Ws of the object in real space is computed based on the images captured in the balanced state at different times T1 and T2 determining that the object is the same as that detected in the image when pitching took place, and distance D from the focal position of camera 1 to the object and vision axis θ of camera 1 are computed based on the computing result. As a result, even when vision axis θ of camera 1 is uncertain when pitching takes place, it is still possible to correctly compute the vision axis θ of camera 1, the distance to the detected object, and the size of the detected object.

Also, when pitching of the vehicle takes place, the y-coordinate of the object in the image is computed based on vision axis θ of camera 1 and the object is mapped on the bird's-eye-view map and displayed on display unit 4. As a result, even when pitching of the vehicle takes place, it is still possible to reliably correct for deviation in the y-direction in the image of the object due to pitching, and to display the corrected result on the bird's-eye-view map.

The foregoing embodiment has been described in order to allow easy understanding of the present invention, and does not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

For example, in the embodiment, in order to detect image velocity 3b and image acceleration 3c, edge extraction processing is performed on the picked-up image, and the optical flow is computed. However, other schemes can be adopted to detect image velocity 3b and image acceleration 3c.

Also, in the embodiment, the image for which image acceleration 3c is zero is judged to be an image captured when the vehicle itself was balanced. However, it is also possible to judge that an image for which image velocity 3b is plus or minus and image acceleration 3c is zero is an image captured when the vehicle itself was balanced. In this way, even when the characteristics on the extension side and those on the contraction side are different due to the vehicle suspension, it is still possible to correctly detect the balance state of the vehicle.

In the embodiment, as an example, it is assumed that there is only one moving object in the image captured with camera 1. However, the present invention is not limited to this scheme. For example, a scheme can be adopted in which multiple moving objects are present in the image. In this case, the processing is performed for all of the objects detected in the image, and the y-coordinate of an object, width Ws of the object in real space, and distance D from the focal position of camera 1 to the object are then computed.

In the embodiment, as an example, when pitching of the vehicle takes place, vision axis θ of camera 1 becomes unclear, so that width Ws of the object in real space is computed, and distance D from the focal position of camera 1 to the object, vision axis θ of camera 1, and the y-coordinate of the object in the image are computed. However, the present invention is not limited to this scheme. For example, a scheme can also be adopted in which even when mounting position of camera 1 deviates and vision axis θ of camera 1 becomes unclear, the method is used to compute width Ws of the object in real space, distance D from the focal position of camera 1 to the object, vision axis θ of camera 1, and the y-coordinate of the object in the image.

In the embodiment, as an example, the detected object is mapped on a bird's-eye-view map for display on display unit 4. However, the present invention is not limited to this scheme. For example, a scheme can be adopted in which the object is mapped on a planar map or on another type of map for display.

In the following claims, the camera 1 corresponds to the image pickup means, and microcomputer 3 corresponds to the image judgment means, object position computing means, acceleration computing means, velocity computing means, and object information computing means.

This application is based on Japanese Patent Application No. 2004-351086, filed Dec. 3, 2004 in the Japanese Patent Office, the entire contents of which are hereby incorporated by reference.

Also, the above-mentioned embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for detecting a position of an object in one or more images captured by an image pickup device mounted on a vehicle, comprising:
   (a) a memory configured to store a plurality of images captured by the image pickup device, wherein the image pickup device is a single camera, including a first image of an object taken at a first time by the single camera and a second image of the object captured at a second time by the single camera; and
   (b) a controller operatively coupled to the memory and configured to determine from the first image taken at the first time the position of the object and a first pitch angle of the vehicle relative to a y-coordinate in a horizontal direction is zero, and to determine from the second image whether a second pitch angle of the vehicle relative to the y-coordinate in the horizontal direction at the second time is zero, and to determine the position of the object in the second image based on the position of the object in the first image if the second pitch angle is not zero.

2. The apparatus of claim 1, wherein the controller is further configured to compute an image acceleration of the second image; and to determine that the second image was captured when the second pitch angle of the vehicle was zero if the image acceleration of the second image is zero.

3. The apparatus of claim 2, wherein the controller is further configured to compute a vertical image velocity of the second image, and to determine that the second image was captured when the second pitch angle of the vehicle was zero if the second image has a zero image acceleration and a non-zero vertical image velocity.

4. The apparatus of claim 1, wherein the memory includes a third image of the object captured at a third time when a third pitch angle of the vehicle is zero, and wherein the controller is further configured to determine the position of the object in the second image based on the position of the object in the first image and the position of the object in the third image.

5. The apparatus of claim 1, wherein the controller is further configured to compute a size of the object in the second image based on a size of the object in the first image if the second image was captured when the second pitch angle of the vehicle was not zero, and to compute a distance between the image pickup device and the object in the second image based on the computed sizes of the object in the first and second images.

6. The apparatus of claim 5, wherein the controller is further configured to compute a vision axis of the image pickup device based on the computed distance if the second image was captured when the second pitch angle of the vehicle was not zero, and to compute the position of the object in the second image based on the computed vision axis.

7. A vehicle, comprising:
(a) an image pickup device mounted on the vehicle to capture a plurality of images of at least one object;
(b) a memory on which is stored the plurality of images captured by the image pickup device, wherein the image pickup device is a single camera, including a first image of the at least one object taken by the single camera at a first time when a first pitch angle of the vehicle relative to a y-coordinate in a horizontal direction is zero and an image acceleration is zero and a second image of the at least one object captured by the single camera at a second time; and
(c) a controller operatively coupled to the memory and configured to determine a position of the at least one object in the first image and to determine from the first image whether a second pitch angle of the vehicle in the second image at the second time is zero, and to determine a position of the at least one object in the second image based on the position of the at least one object in the first image if the second pitch angle is not zero.

8. The vehicle of claim 7, wherein the controller is further configured to compute an image acceleration of the second image; and to determine that the second image was captured when the second pitch angle of the vehicle was zero if the image acceleration of the second image is zero.

9. The vehicle of claim 8, wherein the controller is further configured to compute a vertical image velocity of the second image, and to determine that the second image was captured when the second pitch angle of the vehicle was zero if the second image has a zero image acceleration and a non-zero vertical image velocity.

10. The vehicle of claim 7, wherein the memory includes a third image of the at least one object captured at a third time when a third pitch angle of the vehicle is zero, and wherein the controller is further configured to determine the position of the at least one object in the second image based on the position of the at least one object in the first image and the position of the at least one object in the third image.

11. The vehicle of claim 7, wherein the controller is further configured to compute a size of the at least one object in the second image based on a size of the at least one object in the first image if the second image was captured when the second pitch angle of the vehicle is not zero, and to compute a distance between the single camera and the at least one object in the second image based on the computed sizes of the at least one object in the first and second images.

12. The vehicle of claim 11, wherein the controller is further configured to compute a vision axis of the single camera based on the computed distance if the second image was captured when the second pitch angle of the vehicle was not zero, and to compute the position of the at least one object in the second image based on the computed vision axis.

13. An apparatus for detecting a position of an object in one or more images captured by a single camera in a vehicle, comprising:
image judgment means for determining whether an image of the object captured by the single camera was captured when a pitch angle of the vehicle relative to a y-coordinate in a horizontal direction was zero and an image acceleration was zero; and
object position computing means for determining a position of the object hi a first image captured by the single camera if the first image was captured when the first pitch angle of the vehicle was not zero, which determination is based on a position in a second image of the same object that was captured by the single camera when a pitch angle of the vehicle was zero and an image acceleration of the second image was zero.

14. A method for detecting a position of an object in an image captured by an image pickup device in a vehicle, comprising:
storing a plurality of images captured by the image pickup device, wherein the image pickup device is a single camera;
determining a pitch angle of the vehicle in each of the plurality of images, an image captured by the single camera and having a first pitch angle of zero being a first image;
determining a position of the object in the first image;
determining whether a second image of the object captured by the single camera was captured when a second pitch angle of the vehicle relative to a y-coordinate in a horizontal direction was zero; and
determining the position of the object in the second image if the second image was captured when the second pitch angle of the vehicle was not zero, which determination is based on the first image of the same object that was captured when the pitch angle of the vehicle was zero.

15. The method of claim 14, wherein determining a pitch angle comprises determining an image acceleration of the image; wherein the pitch angle of the vehicle is determined to be zero if the image acceleration is zero.

16. The method of claim 15, further comprising determining a vertical image velocity of each of the plurality of images; wherein the pitch angle of the vehicle is determined to be zero if an image has a zero image acceleration and a non-zero vertical image velocity.

17. The method of claim 14, further comprising providing a third image of the object captured when a third pitch angle of the vehicle was zero, and wherein the position of the object in the second image is determined based on the positions of the object in the first image and in the third image.

18. The method of claim 14, further comprising computing a size of the object in the first image and computing a size of the object in the second image based on the size of the object in the first image if the second image was captured when the second pitch angle of the vehicle was not zero, and computing the distance between the single image pickup device and the object based on the computed sizes of the object in the first and second images.

19. The method of claim 18, further comprising computing a vision axis of the single image pickup device based on the computed distance of the object, if the second image was captured when the second pitch angle of the vehicle was not zero, and computing the position of the object in the second image based on the computed vision axis.

* * * * *